United States Patent [19]
Mullen

[11] Patent Number: 5,775,227
[45] Date of Patent: Jul. 7, 1998

[54] ELECTRIC VEHICLE TRANSPORT SYSTEM

[76] Inventor: Charles F. Mullen, 204 Yacht Club La., Seabrook, Tex. 77586

[21] Appl. No.: 736,856

[22] Filed: Oct. 28, 1996

[51] Int. Cl.$^6$ ........................................... B61L 3/00
[52] U.S. Cl. ..................... 104/88.04; 104/288; 104/295; 104/244
[58] Field of Search ............................ 104/88.01, 88.02, 104/88.03, 88.04, 88.05, 122, 124, 288, 289, 295, 299, 300, 301, 244

[56] References Cited

U.S. PATENT DOCUMENTS

| | | | |
|---|---|---|---|
| 3,587,470 | 6/1971 | Wilson | 104/88.02 |
| 3,590,743 | 7/1971 | Larson | 104/88.02 |
| 4,791,871 | 12/1988 | Mowll | 104/88.02 |
| 5,029,665 | 7/1991 | Harada | 104/88.01 |
| 5,108,052 | 4/1992 | Malewicki et al. | 104/88.02 |
| 5,267,173 | 11/1993 | Tanizawa et al. | 104/88.03 |
| 5,289,778 | 3/1994 | Romine | 104/88.04 |
| 5,590,604 | 1/1997 | Lund | 104/88.04 |
| 5,592,883 | 1/1997 | Andress | 104/88.03 |

FOREIGN PATENT DOCUMENTS 3834-211  4/1990  Germany ........................ 104/88.03

*Primary Examiner*—Mark T. Le

*Attorney, Agent, or Firm*—Kenneth A. Roddy

[57] ABSTRACT

An electric vehicle transport system makes conventional electric vehicles practical for cross-country or inter-city travel, and greatly decreases air pollution caused by emissions from combustion engine vehicles, and at the same time allows the vehicle occupant(s) to operate their vehicle electrical accessories as they are being transported, and arrive at their destination with fully charged batteries. A plurality of electric transport modules run on an electric rail guideway between loading and unloading stations and transport one or more individual electric powered vehicles, which may have a limited driving range, or fuel powered vehicles. The vehicles are driven onto the electric transport modules, secured to a parking platform, and the vehicle battery or electrical system is connected to an electrical power supply on the transport module. The occupant(s) selects and inputs their desired destination into a computerized control system of the electric transport module. As the modules transport the vehicles to an unloading station, the battery or batteries of the vehicle are recharged and the occupant(s) may operate their radio, air conditioner, heater, etc., without draining the vehicle battery or batteries. After arriving at the unloading station, the vehicle with a freshly recharged battery is uncoupled from the power supply and driven to the specific destination under its own power. Freight, mail, and other commodities may also be transported on the electric transport modules.

9 Claims, 5 Drawing Sheets

ELECTRIC VEHICLE TRANSPORT SYSTEM

BACKGROUND OF THE INVENTION

1. Field of the Invention

This invention relates generally to electric vehicles and electrified roadways, and more particularly to an electric vehicle transport system which utilizes a plurality of electric transport modules which run on an electric rail guideway between loading and unloading stations and which receive and transport one or more individual electric or fuel powered vehicles.

2. Brief Description of the Prior Art

Exhaust from combustion engine vehicles has become a major source of air pollution in urban areas because it is the least amenable to clean up. Traffic congestion is another major problem in urban areas and adds to the air pollution problem.

Replacing combustion engine vehicles with electric vehicles is one of the solutions to the air pollution problem, however, mass acceptance of the electric vehicle has been slow because of technical problems. Currently, electric vehicles have a limited driving range because the state-of-the-art batteries require frequent recharging. More advanced batteries are being developed to extend the driving range, however, the more advanced batteries will be expensive.

Electric vehicles have already been and are currently being developed by many major automobile companies which will be priced competitively with conventional combustion engine vehicles. Thus, in the future there will be many different makes, styles and sizes of electric vehicles on the highways and city streets.

Although more efficient electric vehicles will eventually be developed, replacing combustion engine vehicles with efficient electric vehicles will still not solve the problem of traffic congestion in urban areas. Also, they will not be particularly suitable for long trips.

It has often been said that Americans have a love affair with the automobile. This is because they want, and can afford, the freedom of instant mobility that the personal vehicle gives them to go where they want in privacy or with whom they want, and in comfort and security. This is one of the main reasons that existing state-of-the-art mass transit systems have not been more heavily patronized in most cities.

There are several types of electric vehicle transit systems known in the art.

A dual-mode "Intelligent Auto/Transit" system is being studied in Denmark known as the RUF (which means "go fast" in Danish). The RUF system utilizes individual intelligent electric or hybrid vehicles that are capable of running both on a conventional highway and on an electrified guideway. The guideway is "passive" in that it has no moving parts and utilizes an inverted "V" monorail on the guideway and an inverted "V" groove running the full length of each electric vehicle. The electric vehicles have motors and conventional wheels for traveling on conventional street surfaces and a second set of motors and wheels in the inverted "V" to travel on the guideway. This system requires electric vehicles that have significant onboard intelligence to run driverless on the guideway, thus the RUF system requires expensive special electric vehicles. Conversely, the present system utilizes an "active" guideway with moving transport modules that are a part of the guideway which allows any electric vehicle, including conventional light-duty electric vehicles, and also conventional combustion engine vehicles to be transported on the guideway.

Passive guideways (having no moving parts) are optimal when there are few vehicles because the guideway is inexpensive and the few electric vehicles are expensive. Active guideways are optimal when there are many vehicles per mile of guideway because the few guideways are expensive but the thousands of individual vehicles are inexpensive.

Another type of transit system known as Personal Rapid Transit (PRT) also utilizes a passive guideway and individual active vehicles which are occupied by from one to four persons. The vehicles do not leave the guideway and travel between stations along the guideway. Since the vehicles do not leave the guideway, the users must travel to the stations by another vehicle or other means.

Still another type of travel system known as an Automated Highway attempts to increase highway capacity by utilizing many individual vehicles which are linked electronically and travel very close together in platoons on a highway having lanes narrower than conventional highway lanes. Although electric vehicles could be part of an Automated Highway platoon, their performance would have to be equal to the other vehicles in the platoon, and would require an advanced battery and performance package. This system also requires vehicles that have significant onboard intelligence and communications capability to run on the Automated Highway, thus requiring expensive special vehicles.

There are several patents which disclose various vehicle transportation systems.

Forsyth et al. U.S. Pat. No. 3,933,258 discloses a large self-propelled carrier vehicle which travels on conventional highways and roads and carries a group of small electrically driven passenger vehicles.

Barratt, U.S. Pat. No. 5,199,358 discloses vehicle guideway and mass transportation system in which electric vehicles are piggybacked onto electrically operated upper sled modules by supporting their front wheels on the upper sled modules. The upper sled modules are connected by struts to a lower airfoil wing travelling in a below grade duct or conduit.

Musachio, U.S. Pat. No. 5,277,285 discloses an electric vehicle transportation system for use with a roadway including spaced conductive sections on the roadway over which electric vehicles having at least three contact members spaced on the vehicle so that at least two contact members are always in contact with opposite poled sections with unidirectional current flow means between each conductor and the motor of the vehicle.

The present invention is distinguished over the prior art in general, and these patents in particular by an electric vehicle transport system that utilizes a plurality of electric transport modules which run on an electric rail guideway between loading and unloading stations and which receive and transport one or more individual electric powered vehicles, which may have a limited driving range, or fuel powered vehicles. The vehicles are driven onto one of the electric transport modules at a loading station. The vehicle is secured to the platform and its battery or electrical system is connected to a power supply on the transport module. The occupant of the electric vehicle selects and inputs their desired destination into the computerized control system of the electric transport module. As the occupant(s) of the vehicle are transported to an unloading station near their destination on the transport module, the battery or batteries of the vehicle are recharged. The occupant(s) may also operate their radio, air conditioner, heater, etc., as they are being transported without draining the vehicle battery or batteries. After arriving at the unloading station, the vehicle with a freshly recharged battery is uncoupled from the platform, its battery system is disconnected from the power supply on the transport module, and it is driven off the transport module to the occupant's specific destination. Freight, mail, and other commodities may also be transported on the electric transport modules.

SUMMARY OF THE INVENTION

It is therefore an object of the present invention to provide an electric vehicle transport system for transporting electric powered and combustion engine powered vehicles to extend their driving range while conserving their batteries and fuel.

It is another object of this invention to provide an electric vehicle transport system for transporting electric powered and combustion engine powered vehicles which will reduce both air pollution and traffic congestion.

Another object of this invention is to provide an electric vehicle transport system having a transport module with an onboard battery charger which can be connected the battery of a vehicle being transported on the module to charge the battery while being transported.

Another object of this invention is to provide an electric vehicle transport system having a transport module with an onboard D.C. voltage power supply which can be connected the electrical system of a vehicle being transported on the module to allow the occupant of a vehicle to operate the electrical accessories such as the radio, air conditioner, and heater without draining the vehicle battery.

Another object of this invention is to provide an electric vehicle transport system having a transport module which may be used to transport vehicles and also other commodities such as freight and mail between distant stations.

A further object of this invention is to provide an electric vehicle transport system which can transport individual conventional state-of-the-art electric and fuel powered vehicles of various makes and models and does not require special individual vehicles having onboard intelligence.

Other objects of the invention will become apparent from time to time throughout the specification and claims as hereinafter related.

The above noted objects and other objects of the invention are accomplished by an electric vehicle transport system that utilizes a plurality of electric transport modules which run on an electric rail guideway between loading and unloading stations and which receive and transport one or more individual electric powered vehicles, which may have a limited driving range, or fuel powered vehicles. The vehicles are driven onto one of the electric transport modules at a loading station. The vehicle is secured to the platform and its battery or electrical system is connected to a power supply on the transport module. The occupant of the electric vehicle selects and inputs their desired destination into the computerized control system of the electric transport module. As the occupant(s) of the vehicle are transported to an unloading station near their destination on the transport module, the battery or batteries of the vehicle are recharged. The occupant(s) may also operate their radio, air conditioner, heater, etc., as they are being transported without draining the vehicle battery or batteries. After arriving at the unloading station, the vehicle with a freshly recharged battery is uncoupled from the platform, its battery system is disconnected from the power supply on the transport module, and it is driven off the transport module to the occupant's specific destination. Freight, mail, and other commodities may also be transported on the electric transport modules.

DESCRIPTION OF THE PREFERRED EMBODIMENT

Figure 1:
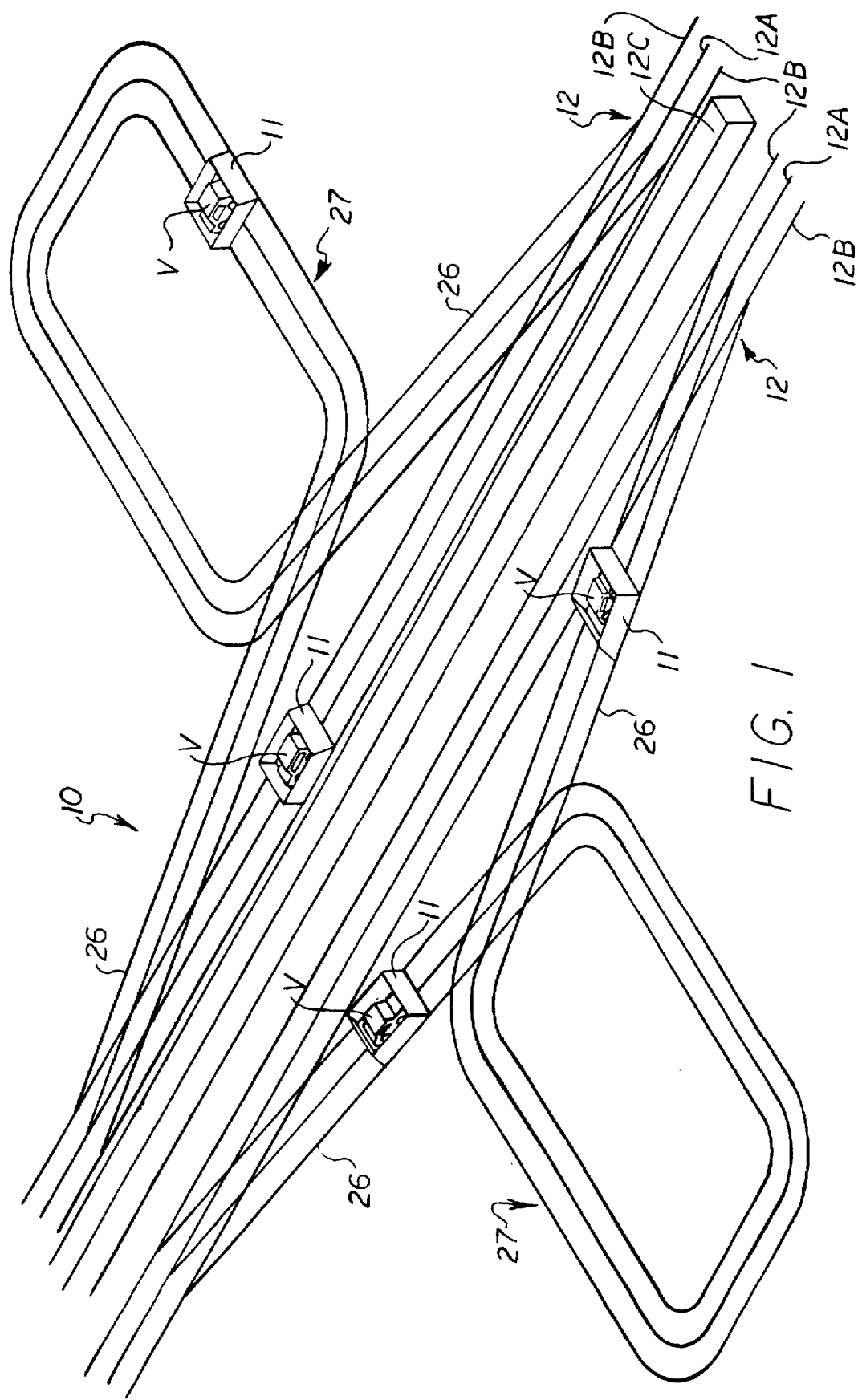
FIG. 1 is a perspective view of the electric vehicle transport system in accordance with the present invention showing a portion of the electric guideway with several transport modules transporting individual vehicles.

Referring to the drawings by numerals of reference, there is shown a perspective view of the electric vehicle transport system 10 in accordance with the present invention. A plurality of electric transport modules 11 are mounted on an electric rail guideway 12. The electric rail guideway 12 has a center rail 12A which is connected to a remote electrical power source and a pair of laterally spaced rails 12B, one at each side of the center rail 12A. The guideway 12 may be provided with one or more sets of the rails 12A and 12B for bi-directional travel. The guideway 12 may have an upstanding divider strip or wall 12C for separating the bi-directional sets of rails.

Figure 2:
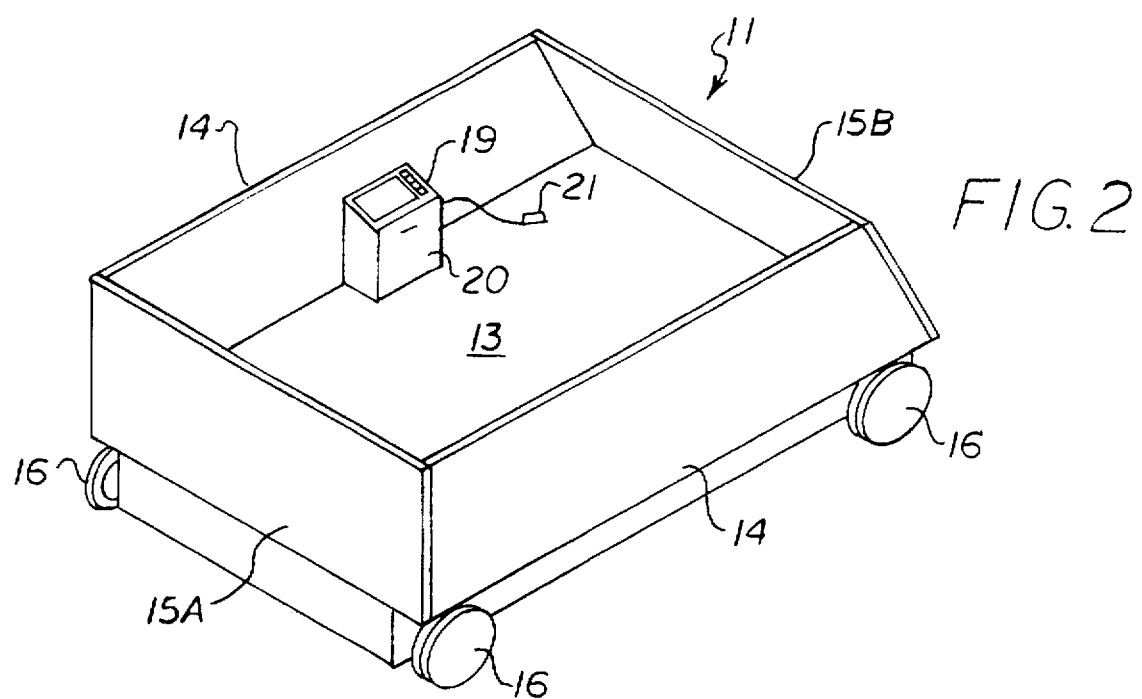
FIG. 2 is a perspective view of a transport module with the end walls in a raised position.
Figure 3:
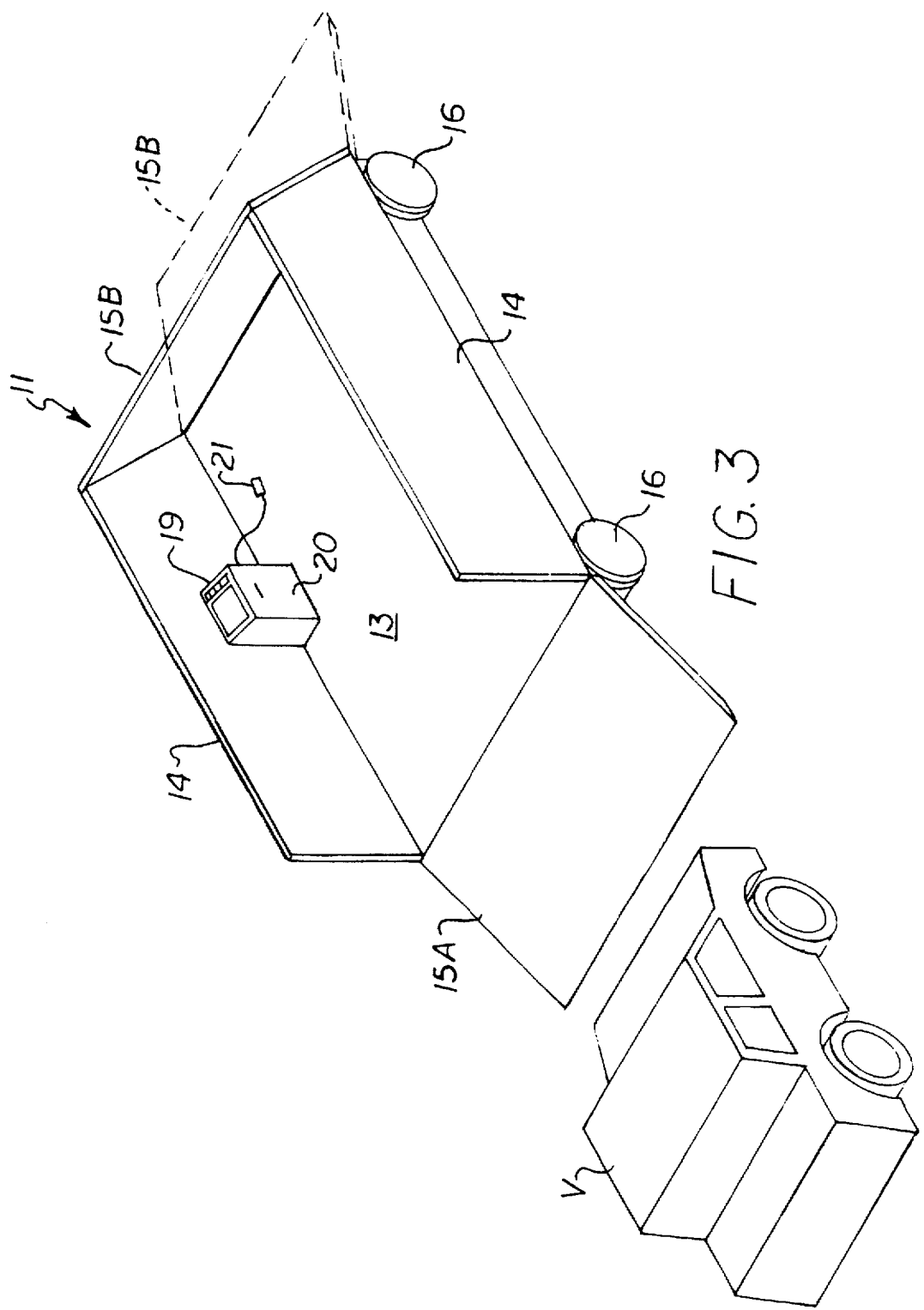
FIG. 3 is a perspective view of a transport module with the end walls in a lowered position.
Figure 4:
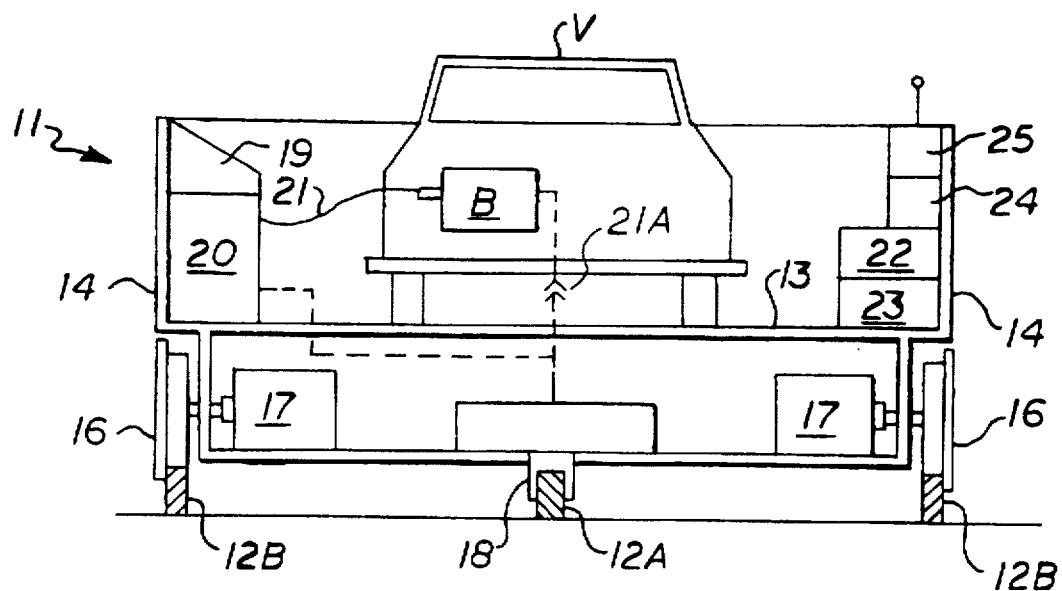
FIG. 4 is a transverse cross section of the transport module in accordance with the present invention supported on a guideway having three rails.

As best seen in FIGS. 2, 3, and 4, each electric transport module 11 has a generally rectangular flat bottom surface which serves as a parking platform 13, side walls 14 which extend upwardly from the top surface, and opposed end walls 15A and 15B pivotally connected at each end of the parking platform 13. The end walls 15A and 15B pivot from a raised position to a lowered position extending angularly downward and outward from the parking platform 13 to form a ramp. The transport modules 11 are sized to carry at least one electric powered or fuel powered vehicle V on the parking platform 13. An important feature if the present invention is that the individual vehicles transported on the transport modules 11 do not require onboard intelligence and conventional state-of-the-art electric and fuel powered vehicles of various makes and models may be carried.

Although the transport modules 11 are illustrated as carrying a single vehicle V, it should be understood that they may be sized to carry a plurality of individual vehicles. It should also be understood that the transport modules 11 may be equipped with freight area for containing various cargo and other objects, and a seating area for seating persons outside of the vehicles, such as car poolers, or non-motorists desiring to go from one station to another.

As best seen in FIG. 4, each electric transport module 11 is supported on wheels 16 rotatably mounted on each side of the module and contains an electric motor or several motors 17. Individual motors 17 may be connected with each wheel 16 for driving the wheels independently, or the wheels may be connected through gear boxes and drive shafts to an electric motor. Each transport module 11 has an electrical power supply contact plate or conductor 18. The electric motors 17 are connected to the electrical power supply contact plate or conductor 18.

The wheels 16 of each electric transport module 11 are rotatably supported on the laterally spaced rails 12B and the electrical power supply contact plate or conductor 18 of the transport module is engaged on the electrified center rail 12A for supplying electricity to the electric motor or motors and to an onboard electronic computerized control system 19 inside the module to rotate the wheels and drive the module along the guideway 12.

Figure 4A:
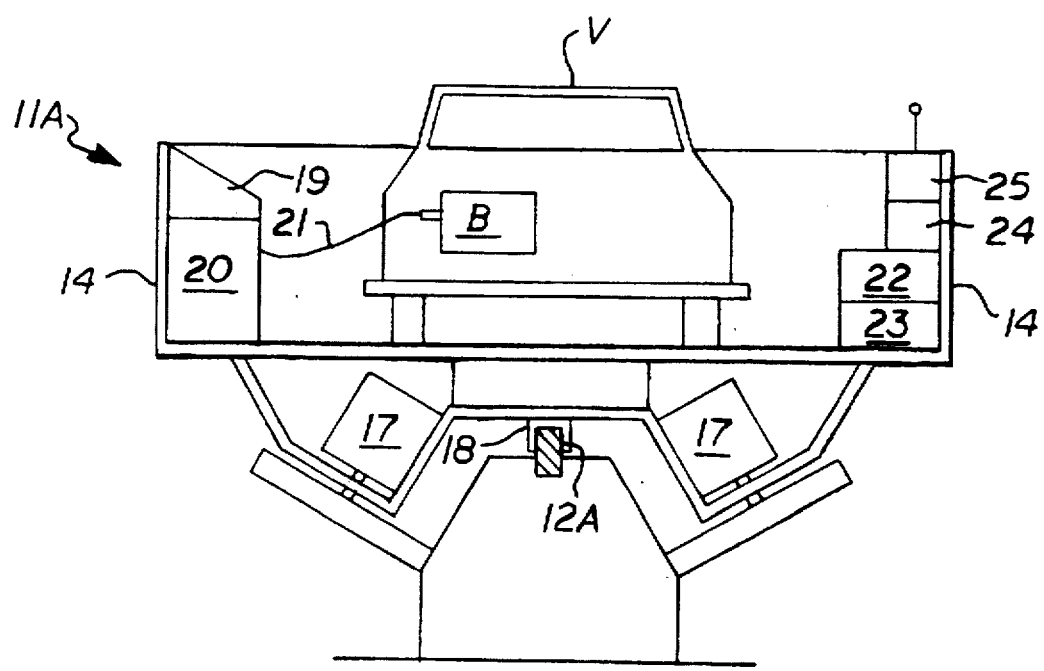
FIG. 4A is a transverse cross section of the transport module in accordance with the present invention supported on a monorail type guideway having a single rail.

FIG. 4A shows a modification of the transport module 11A which is adapted to be supported on a monorail type guideway having a single rail 12A. In this modification, the wheels 16 are rotatably engaged on an angular portion of the structure supporting the rail 12A.

The onboard electronic computerized control system 19 is connected with the motors 17 and controls the operation of driving the transport module along the guideway 11. The electronic computerized control system 19 includes a memory, a display for displaying the identity of stations along the guideway, a keyboard or other means for inputting data corresponding to the identity of a selected destination station, program means for translating the data into operational signals, programmable drivers for operating the motors and starting and stopping the transport module, and an operating program stored in memory for activating the drivers to drive the transport module along the guideway to the selected destination station and to stop the transport module upon arrival.

The control system may display a map of the route with lights indicating the present location of the module along the route and a warning signal or voice message alerting passengers when the module is approaching their destination station.

Each transport module 11 has an onboard electronic D.C. voltage power supply unit which includes a battery charging unit 20 connected with the electrical conductor 18 for receiving electric energy therefrom. An umbilical vehicle electrical connector 21 is connected at one end to the battery charging unit 20 and its other end is adapted to be releasably connected to the battery B or the electrical system of a vehicle V parked on the parking platform 13 to supply D.C. voltage to the vehicle electrical system or charge the battery B while the vehicle is being transported to a destination station.

Each transport module 11 may also have an onboard reserve electrical power supply battery unit 22 connected with the electrical conductor 18 for receiving electric energy therefrom so that the reserve electrical power supply battery unit 22 is maintained in a charged condition in the event of a power failure of the electrically conductive rail 12A or the electrical source connected with the electrically conductive rail.

Each transport module 11 may also have an onboard petroleum fuel driven electric generator 23 connected with the electric motors 17 and the electronic computerized control system 19 for supplying power thereto in the event of a power failure of the electrically conductive rail 12A or the electrical source connected with the electrically conductive rail.

Electric vehicles V which may utilize the electric vehicle transport system, are conventional small electric vehicles, which may have a limited driving range. The electric or fuel powered vehicles V may be modified by connecting an electrical adapter to the vehicle battery assembly or to the vehicle electrical system. The adapter allows the electric or fuel powered vehicle V to be "plugged in" to the umbilical vehicle electrical connector 21 on the transport modules 11. In the future, vehicles may be provided with such an adapter at the factory when they are built. The transport module 11 may also have an automatic coupling mechanism 21A for automatically connecting the vehicle electrical system or battery to the battery charging unit 20 or electical conductor 18 when the vehicle is parked.

The transport modules 11 may be equipped with a signal generator 24 and a signal sensor or receiver 25 connected with the electronic computerized control system 19, and the control system provided with a proximity control program for translating received signals into operational signals and operating the programmable drivers responsive to the received signals for operating the motors and controlling the speed of one transport module 11 with respect to its proximity to another transport module to maintain spacing and avoid contact or collision between two adjacent modules.

Thus, the center rail 12A of the electric guideway 12 supplies electricity to drive the transport modules 11, and the modules in turn supply electricity to the individual vehicles V which are carried on their parking platform 13.

The guideways 12 extend for miles between various major points in a city and may also extend between cities. Most large cities have an efficient ring and spoke network of expressways or freeways that serve as the main arterys between major points in a city and extend between cities. The guideways 12 of the present invention may be disposed in or above the medians of these existing expressways or freeways. The guideways 12 may also be disposed on or above utility and railroad right-of-ways or easements.

Figure 5:
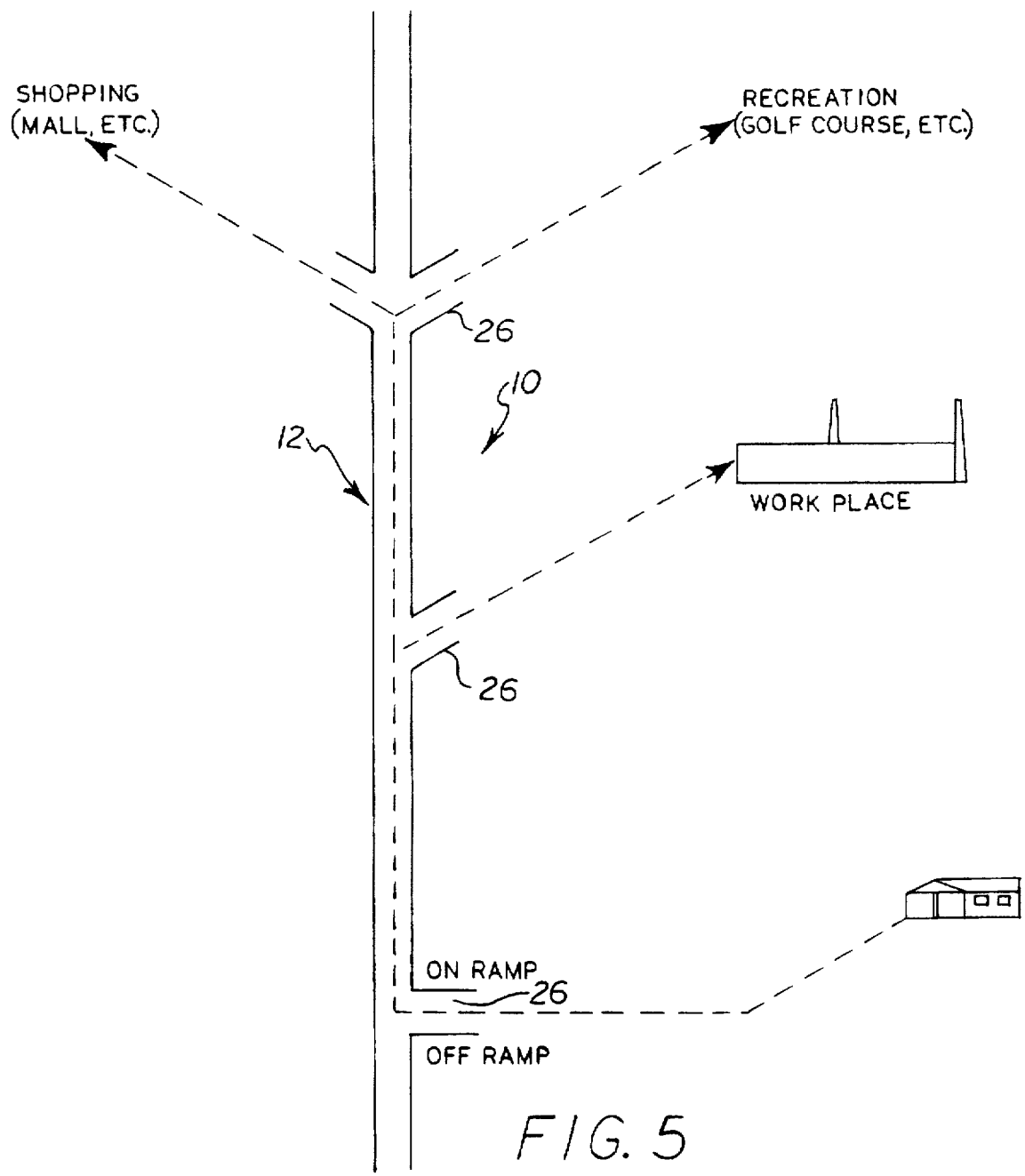
FIG. 5 is a schematic view of an elevated electric guideway network of the electric vehicle transport system extending between a home, workplace, shopping mall, and recreation area.

The guideways 12 are provided with entrances and exits 26 which connect the main guideway to loading and unloading stations 27 which may be disposed on each side of the bi-directional guideway. As shown schematically in FIG. 5, the loading and unloading stations 27 are located near homes, workplaces, shopping malls, and recreation areas. The rails 12A and 12B extend between the loading and unloading stations 27, along the entrances and exits 26 and join the main guideway 12 in an endless loop configuration (FIG. 1). The entrances and exits 26 are of sufficient length to allow the entering modules to reach the speed of the modules traveling on the main guideway and to allow the exiting modules to safely slow down before coming to a stop at the unloading station.

OPERATION

The individual vehicles V, which may be conventional small electric vehicles with a limited driving range or fuel powered vehicles, are driven to a loading station 27 which is located a convenient distance from the driver's home, office, shopping center, etc. The vehicle V is then driven up the ramp 15A (end wall at one end) onto the parking platform 13 of an electric transport module 11. The vehicle V is then secured to the parking platform 13 by suitable means as straps or locking devices, and its battery or electrical system is connected to the power supply of the transport module manually by plugging the umbilical vehicle electrical connector 21 of the transport module 11 into the adapter of the vehicle or automatically through the automatic coupling mechanism 21A when the vehicle is parked.

After the vehicle V has been secured and electrically connected, the occupant of the vehicle selects and inputs their desired destination into the computerized control system 19 on the electric transport module 11. The computerized control system 19 will display a selection of unloading stations near the desired destination. After the traveler selects the proper unloading station, a program stored in memory or at a central processing station activates the transport module 11 causing the end wall 15A to be raised and the transport module leaves the loading station and enters the main guideway system. The transport module 11 carrying the vehicle V picks up speed and enters the main guideway and travels thereon until reaching the exit determined by the program.

The batteries of the electric powered or fuel powered vehicle V are recharged as the occupant(s) of the vehicle are being transported to the unloading station on the transport module 11. The occupant(s) may also operate their radio, air conditioner, heater, etc., as they are being transported without draining the batteries of the vehicle.

The passengers may also be informed of their progress along the route by lights on a displayed map of the route and be alerted when the transport module 11 is approaching their destination station by a warning signal or voice message.

When the transport module carrying the vehicle reaches the exit determined by the computer control program, it exits the main guideway and safely slows down before coming to a stop at the loading and unloading station.

After the transport module 11 has stopped at the unloading station, the electric powered or fuel powered vehicle V with a freshly recharged battery is uncoupled from the module, its adapter is unplugged from the umbilical connector 21 on the transport module to disconnect its battery or electrical system from the power supply of the transport module, the opposed end wall 15B is then lowered to form a ramp, and the vehicle is driven off the parking platform and down the off ramp of the module. The driver can then drive to their specific destination which should only be a few miles from the unloading station.

The electric vehicle transport system of the present invention may also be used around the clock to transport freight, mail, and other commodities and cargo between various major points in a city or between cities. The present transport system can be used for transporting conventional combustion engine vehicles which may or may not require battery recharging, and will allow the driver/occupants to utilize the vehicle electrical accessories such as the radio, heater, air conditioner, etc., without running draining the vehicle battery.

While this invention has been described fully and completely with special emphasis upon preferred embodiments, it should be understood that within the scope of the appended claims the invention may be practiced otherwise than as specifically described herein.

I claim:

1. An electric vehicle transport system for electric powered and fuel powered vehicles, comprising:

a guideway extending between stations including an electrically conductive center rail extending longitudinally of said guideway connected with an electrical source for supplying electric energy thereto and a pair of wheel support rails disposed one at each side of said electrically conductive center rail in laterally spaced relation extending longitudinally of said guideway;

at least one electrically powered transport module having a platform for supporting at least one individual vehicle and other objects thereon, electrical conductor means on said transport module engaged in electrical contact with said electrically conductive center rail for receiving electric energy therefrom, and a set of wheels on laterally opposed sides of said transport module rotatably engaged with said wheel support rails for supporting said transport module thereon whereby said transport module is driven along said guideway with said electrical conductor in contact with said electrically conductive center rail;

electric motor means on said transport module connected with said electrical conductor means and said set of wheels for driving said transport module along said guideway;

D.C. voltage sower supply and battery charging means on said transport module connected with said electrical conductor means for receiving electric energy therefrom and including connection means for releasably connecting said D.C. voltage power supply means to a battery and electrical system of a vehicle parked on said platform to charge said battery and supply D.C. voltage to said vehicle electrical system for operating electrical accessories while said vehicle is being transported to said selected destination station;

an electronic computerized control system on said transport module connected with said motor means for controlling the operation of driving said transport module between said stations, including memory means, display means for displaying the identity of stations along said guideway, means for inputting data corresponding to the identity of a selected destination station, program means for translating said data into operational signals, programmable drivers for operating said motor means and starting and stopping said transport module, and an operating program stored in said memory means for activating said drivers to drive said transport module along said guideway to said selected destination station and to stop said transport module upon arrival; whereby an individual may park a vehicle on said platform of said transport module and select a desired destination station by inputting said data corresponding to the identity of said desired destination station into said computerized control system and activating said operating program and thereafter be transported along with said parked vehicle by said transport module to said selected destination station while charging said battery and operating electrical accessories of said parked vehicle, and after arriving at said destination station, to drive said vehicle off of said platform.

2. An electric vehicle transport system according to claim 1 further comprising:

a reserve electrical power supply means on said transport module connected with said electrical conductor means for receiving electric energy therefrom to maintain said reserve electrical power supply means in a charged condition;

said reserve electrical power supply means connected with said electric motor means and said electronic computerized control system for supplying power thereto to drive said transport module along said guideway to said selected destination station and to stop said transport module upon arrival in the event of a power failure of said electrically conductive center rail or said electrical source connected with said electrically conductive center rail.

3. An electric vehicle transport system according to claim 1 further comprising:

a petroleum fuel driven electric generator on said transport module connected with said electric motor means and said electronic computerized control system for supplying power thereto to drive said transport module along said guideway to said selected destination station and to stop said transport module upon arrival in the event of a power failure of said electrically conductive center rail or said electrical source connected with said electrically conductive center rail.

4. An electric vehicle transport system according to claim 1 wherein there are a plurality of said electrically powered transport modules each having a signal generating means and a signal receiving means connected with said electronic computerized control system; and said computerized control system has a proximity control program for translating received signals into operational signals and operating said programmable drivers responsive to said received signals for operating said motor means and controlling the speed of one of said transport modules with respect to its proximity to another one of said modules to avoid contact between two adjacent modules.

5. An electrically powered transport module movably supported on laterally spaced wheel support rails extending longitudinally of a guideway extending between stations and receiving electrical power from an electrically conductive center rail disposed between the wheel support rails extending longitudinally of the guideway connected with an electrical source for transporting electric powered and fuel powered vehicles and other objects between stations along said guideway, said transport module comprising:

an electrically powered transport module having a platform for supporting at least one individual vehicle and other objects thereon, electrical conductor means engaged in electrical contact with said electrically conductive center rail for receiving electrical energy therefrom, and a set of wheels on laterally opposed sides of said transport module rotatably engaged with said wheel support rails for supporting said transport module thereon whereby said transport module is driven along said guideway with said electrical conductor in contact with said electrically conductive center rail;

electric motor means on said transport module connected with said electrical conductor means and said set of wheels for driving said transport module along said guideway;

D.C. voltage power supply and battery charging means on said transport module connected with said electrical conductor means for receiving electric energy therefrom and including connection means for releasably connecting said D.C. voltage power supply means to a battery and electrical system of a vehicle parked on said platform to charge said battery and supply D.C. voltage to said vehicle electrical system for operating electrical accessories while said vehicle is being transported to said selected destination station;

an electronic computerized control system on said transport transport module connected with said motor means for controlling the operation of driving said transport module between said stations, including memory means, display means for displaying the identity of stations along said guideway, means for inputting data corresponding to the identity of a selected destination station, program means for translating said data into operational signals, programmable drivers for operating said motor means and starting and stopping said transport module, and an operating program stored in said memory means for activating said drivers to drive said transport module along said guideway to said selected destination station and to stop said transport module upon arrival; whereby an individual may park a vehicle on said platform of said transport module and select a desired destination station by inputting said data corresponding to the identity of said desired destination station into said computerized control system and activating said operating program and thereafter be transported along with said parked vehicle by said transport module to said selected destination station while charging said battery and operating electrical accessories of said parked vehicle, and after arriving at said destination station, to drive said vehicle off of said platform.

6. An electrically powered transport module according to claim 5 further comprising:

a reserve electrical power supply means on said transport module connected with said electrical conductor means for receiving electric energy therefrom to maintain said reserve electrical power supply means in a charged condition;

said reserve electrical power supply means connected with said electric motor means and said electronic computerized control system for supplying power thereto to drive said transport module along said guideway to said selected destination station and to stop said transport module upon arrival in the event of a power failure of said electrically conductive center rail or said electrical source connected with said electrically conductive center rail.

7. An electrically powered transport module according to claim 5 further comprising:

a petroleum fuel driven electric generator on said transport module connected with said electric motor means and said electronic computerized control system for supplying power thereto to drive said transport module along said guideway to said selected destination station and to stop said transport module upon arrival in the event of a power failure of said electrically conductive center rail or said electrical source connected with said electrically conductive center rail.

8. An electrically powered transport module according to claim 5 wherein said transport module has signal generating means and signal receiving means connected with said electronic computerized control system; and said computerized control system has a proximity control program for translating received signals into operational signals and operating said programmable drivers responsive to said received signals for operating said motor means and controlling the speed of one of said transport modules with respect to its proximity to another one of said transport modules to avoid contact between two adjacent modules.

9. A method for electrically transporting electric powered and fuel powered vehicles to extend their driving range while conserving their batteries and fuel, comprising the steps of:

providing a guideway extending between stations including an electrically conductive center rail extending longitudinally of said guideway connected with an electrical source for supplying electric energy thereto and a pair of wheel support rails disposed one at each side of said electrically conductive center rail in laterally spaced relation extending longitudinally of said guideway;

providing at least one electrically powered transport module having a platform for supporting at least one individual vehicle and other objects thereon, said transport module having electrical conductor means engaged in electrical contact with said electrically conductive center rail for receiving electric energy therefrom, a set of wheels on laterally opposed sides of said transport module rotatably engaged with said wheel support rails for supporting said transport module thereon whereby said transport module is driven along said guideway with said electrical conductor in contact with said electrically conductive center rail, and electric motor means connected with said electrical conductor means and said set of wheels for driving said transport module along said guideway;

providing D.C. voltage power supply and battery charging means on said transport module connected with said electrical conductor means for receiving electric energy therefrom and including connection means for releasably connecting said D.C. voltage power supply means to a battery and electrical system of a vehicle parked on said platform;

providing an electronic computerized control system on said transport module connected with said motor means for controlling the operation of driving said transport module between said stations, including memory means, display means for displaying the identity of stations along said guideway, means for inputting data corresponding to the identity of a selected destination station, program means for translating said data into operational signals, programmable drivers for operating said motor means and starting and stopping said transport module, and an operating program stored in said memory means for activating said drivers to drive said transport module along said guideway to said selected destination station and to stop said transport module upon arrival;

parking at least one vehicle on said platform of said transport module;

connecting said D.C. voltage power supply and battery charging means to said battery and electrical system of said parked vehicle to supply D.C. voltage thereto;

selecting a desired destination station by inputting said data corresponding to the identity of said desired destination station into said computerized control system and activating said operating program; whereby said at least one vehicle is transported by said transport module to said selected destination station and while being transported said battery is charged and said electrical accessories of said parked vehicle may be operated, and after arriving at said destination station;

driving said vehicle off of said platform.

\* \* \* \* \*